United States Patent [19]

Harben, Jr.

[11] 3,833,966

[45] Sept. 10, 1974

[54] METHOD AND APPARATUS FOR KILLING POULTRY

[75] Inventor: Grover S. Harben, Jr., Gainesville, Ga.

[73] Assignee: Gainesville Machine Company, Inc., Gainesville, Ga.

[22] Filed: May 17, 1972

[21] Appl. No.: 253,947

Related U.S. Application Data

[63] Continuation of Ser. No. 22,616, March 25, 1970, abandoned.

[52] U.S. Cl............................ 17/1 E, 17/11 R
[51] Int. Cl............................ A22b 21/00
[58] Field of Search ................. 17/1 E, 11 R

[56] References Cited
UNITED STATES PATENTS

| | | |
|---|---|---|
| 3,377,649 | 4/1968 | Rains.................................. 17/1 E |
| 3,474,490 | 10/1969 | Groover et al..................... 17/1 E X |
| 3,564,645 | 2/1971 | Brugman............................. 17/1 E |

Primary Examiner—Louis G. Mancene
Assistant Examiner—D. L. Weinhold
Attorney, Agent, or Firm—Newton, Hopkins & Ormsby

[57] ABSTRACT

A chicken or other fowl is killed by first stunning with an electrical shock, then by cutting the jugular vein in successive steps rapidly performed. The apparatus includes a wire brush electrode disposed in the path of a chicken conveyor, a spinning circular blade and a head-supporting movable belt for turning the head of the stunned chicken toward the blade.

10 Claims, 5 Drawing Figures

INVENTOR
GROVER S. HARBEN, Jr.

BY Newton, Hopkins, & Ormsby
ATTORNEYS

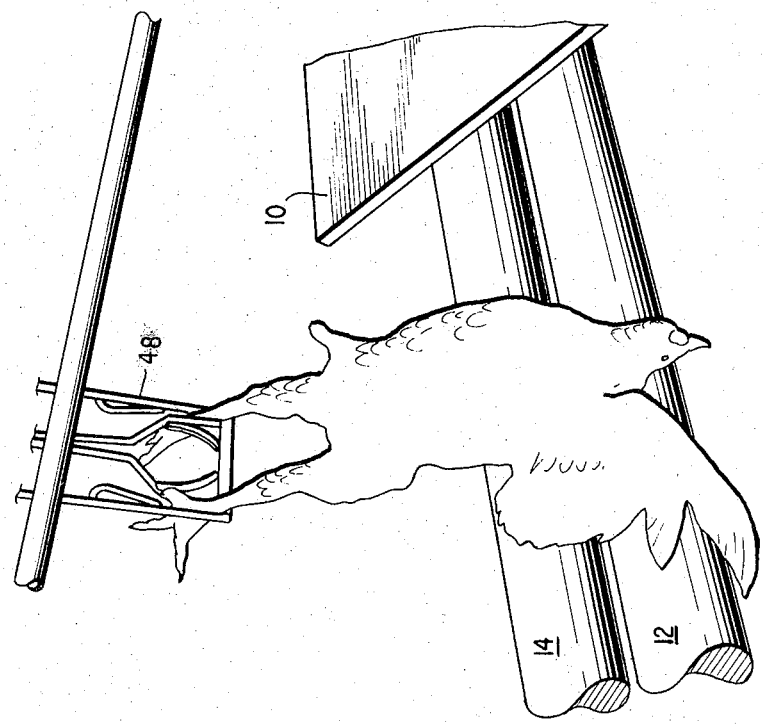
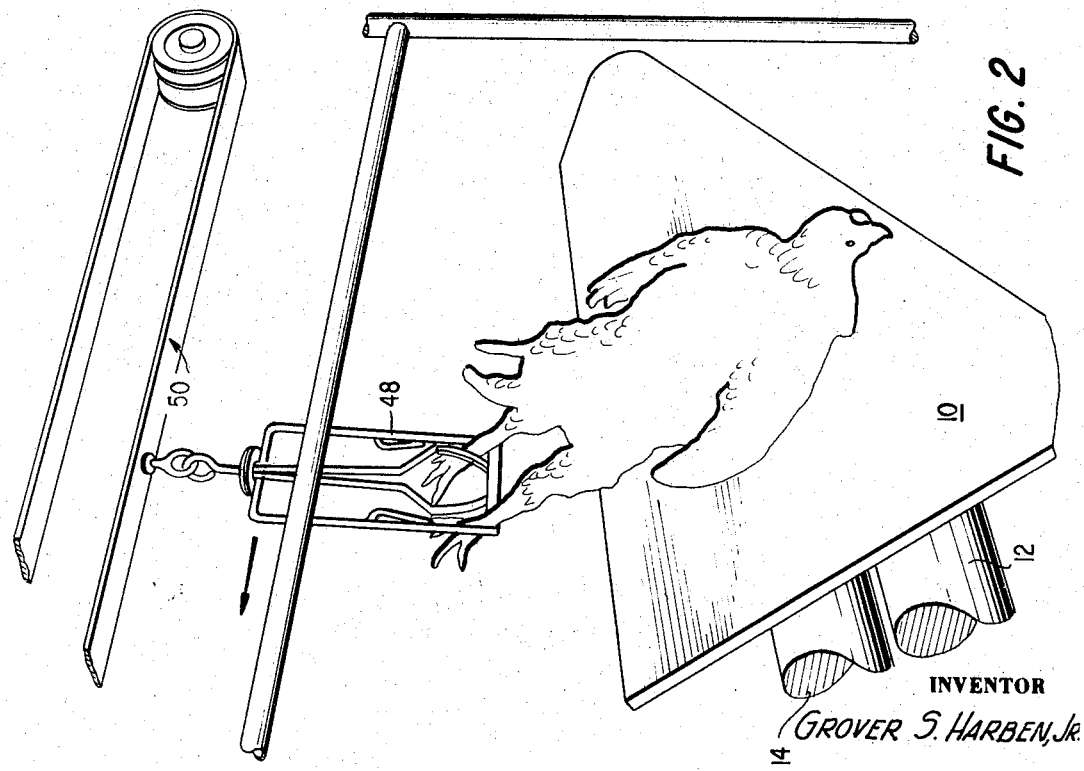

INVENTOR
GROVER S. HARBEN, JR.

BY Newton, Hopkins, & Ormsby
ATTORNEYS 3,833,966

METHOD AND APPARATUS FOR KILLING POULTRY

This is a continuation of application Ser. No. 22,616, filed March 25, 1970, now abandoned.

BACKGROUND OF THE INVENTION

This invention relates generally to the killing of poultry and more particularly to a novel method of stunning and killing a chicken or other fowl and an improved apparatus for automatically performing such an operation in accordance with that method.

In the past, various methods have been employed by poultry processors for killing the poultry in a manner that could be carried out rapidly, with as little human effort as possible, and such that the bird or fowl would not become excessively excited. Automatic processes have been devised wherein the chicken or other fowl is first stunned and subsequently killed, but heretofore these steps have been carried out completely separately, often requiring at least some manual effort in proceeding from one to the other, and thus have proven to be both expensive and time-consuming.

SUMMARY OF THE INVENTION

Accordingly, it is an object of the present invention to provide a novel method of stunning and killing chickens and the like without overly exciting the chicken.

Another object of the present invention is to provide an improved apparatus for automatically stunning and killing poultry.

Yet another object of this invention is to provide an improved apparatus for automatically stunning and killing poultry which is swift and will not overly excite the poultry.

Still another object of the invention is to provide an improved apparatus for automatically stunning and killing poultry in rapid sequence.

These objects and others are attained by a continuous operation involving electrically shocking the chicken or other fowl, then severing the jugular vein thereof in relatively quick succession. An apparatus having a wire brush equipped with an electrode for wiping away feathers to give the chicken a better shock and a blade positioned in a path along which the chicken is automatically conveyed is provided for performing the method disclosed herein.

BRIEF DESCRIPTION OF THE DRAWINGS

These and other features and advantages of the present invention will be more clearly understood from the following detailed description and the accompanying drawings in which like reference numerals designate corresponding parts throughout the several views and wherein:

FIG. 2 is a view in perspective of a portion of the apparatus illustrated in FIG. 1 and showing a chicken being conveyed across an orientation plate as it is introduced into the system;

FIG. 3 is a view in perspective of a chicken being conveyed across a pair of positioning rollers after leaving the orientation plate shown in FIG. 2;

Figure 1:
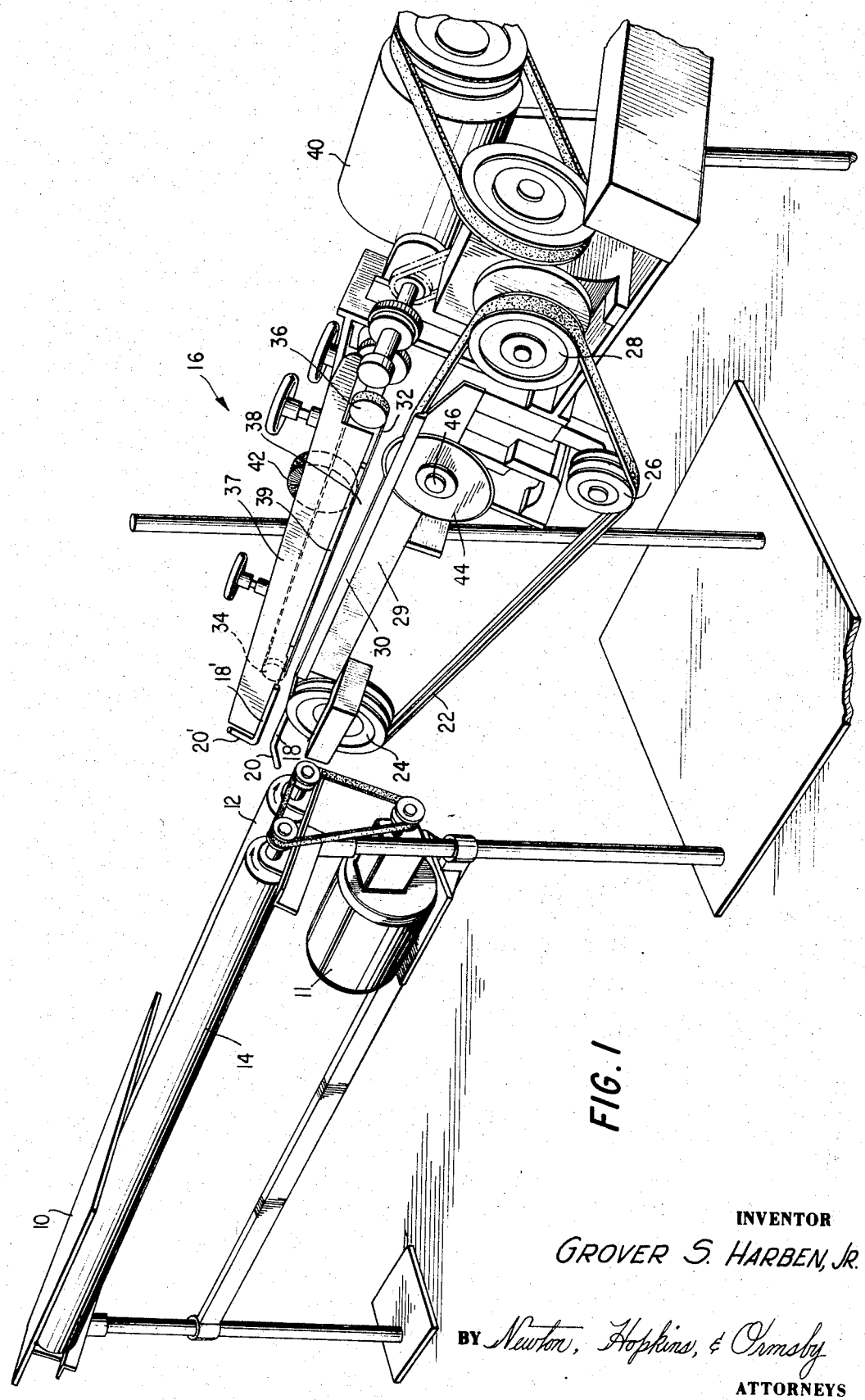
FIG. 1 is a general overall view in perspective of an apparatus constructed in accordance with and embodying the principles of the present invention.

The stunning and killing unit 16 is positioned at the end of the elongated rollers 12 and 14 adjacent the table 10. The rollers are rotated in the direction indicated by the arrows thereon by conventional electric motor means 11. A pair of parallel guide bars 18, 18' having diverging, substantially perpendicular extensions 20, 20', respectively, on the ends thereof, protrude from the unit 16 over a portion of the lower roller 12.

An endless belt 22 is shown positioned on pulleys 24, 26, and 28 secured to a lower frame section 29 of unit 16 and in one portion of its length passes over a longitudinal guide member 30 which is aligned with the lower guide bar 18 also secured to the lower frame. Another endless belt 32 moves about pulleys 34 and 36 on an upper frame section 37 so that the lower side of the elongated loop pattern formed thereby passes over a longitudinal guide 39 which is aligned with the upper guide bar 18' on frame 37 and lies along a line parallel to and slightly spaced from the guide 30 to define an elongate channel or course 38 therebetween. The belts 22 and 32 are driven by an electric motor 40 of known type through gear reduction mechanism of known type integrally associated therewith and engaging the pulleys 28 and 36, respectively. Operatively, as viewed in FIG. 1, the belt 32 is driven in a counterclockwise path about the pulleys 34 and 36, whereas the belt 22 is drawn about the pulleys 24, 26 and 28 and the guide 30 in a clockwise path and at a speed such that a point on the belt 22 moves through the channel area 38 slightly faster than does a similar point on the upper belt 32, the purpose of which will be set forth hereinafter.

At a point approaching the end of the course 38 opposite the end thereof supporting the guide bars 18, 18', there is disposed on the upper frame support structure 27 a wheel-shaped wire brush 42. The wire brush 42 is mounted on a motor-driven shaft for rotation about the axis thereof and is connectd to an electrical power source of 110 volts such that a spinning, multiple-pointed electrode is essentially established thereby. The electrode brush 42 is positioned on the upper frame 37 in such a manner that the plane in which it spins is substantially parallel to the plane in which the blets 22 and 32 and the pulleys therefor lie. A small arcuate portion of the brush is designed to extend into the channel area 38 and the brush shaft and drive may be vertically shifted relative thereto in order to permit adjustment of the degree to which the brush wires extend into the channel from beneath the level of the belt 32.

Longitudinally displaced between the brush 42 and the end of the channel 38 remote from the guide bars 18, 18' is a circular blade 44 mounted on a motor-driven shaft 46 disposed in the lower frame section 29. The blade 44 is positioned adjacent the belt 22 such that it lies in a plane substantially parallel to the plane in which the belts 22 and 32 move, with only a small arcuate portion thereof extending into the channel 38 between the guide members 30 and 39.

OPERATION

Referring now to FIGS. 2 and 3, the chicken is suspended head lowermost from a shackle 48 and carried by a conveyor 50 of conventional known type. As the shackle 48 approaches the unit 16, the chicken first engages the tilted orientation table 10 with its brest disposed against the table. Here, as the bird is conveyed across the plate or table, it is resting comfortably and has been found to not become nervous or overly excited.

Leaving the plate 10, the bird is picked up by rollers 12 and 14, where the head is gently eased forward by the rotation of the lower roller 12 on the neck of the chicken and wings of the bird, though possibly spread, are urged forward by the rotating upper roller 14.

Figure 4:
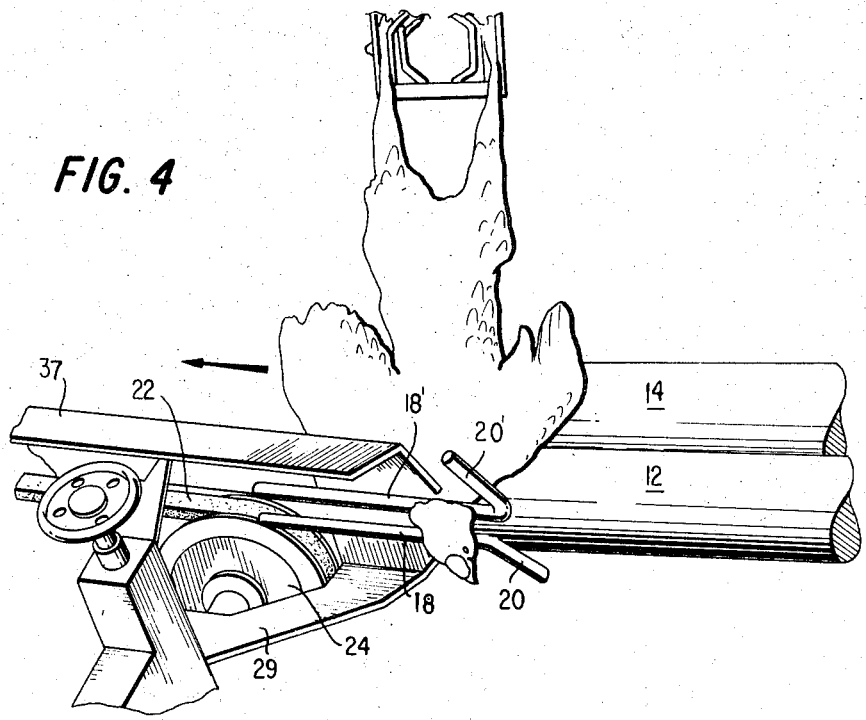
FIG. 4 is a view in perspective showing the head of the chicken being introduced between a set of moving belts; and, FIG. 5 is another view in perspective showing the chicken being conveyed toward the wire brush and the cutting blade.

When the bird reaches the unit 16, the head thereof has been oriented so that it readily passes between the guide bars 18 and 18', as shown in FIG. 4. At this stage, even if the bird became excited, which has not been found to be the case, it is unable to withdraw its head.

Figure 5:
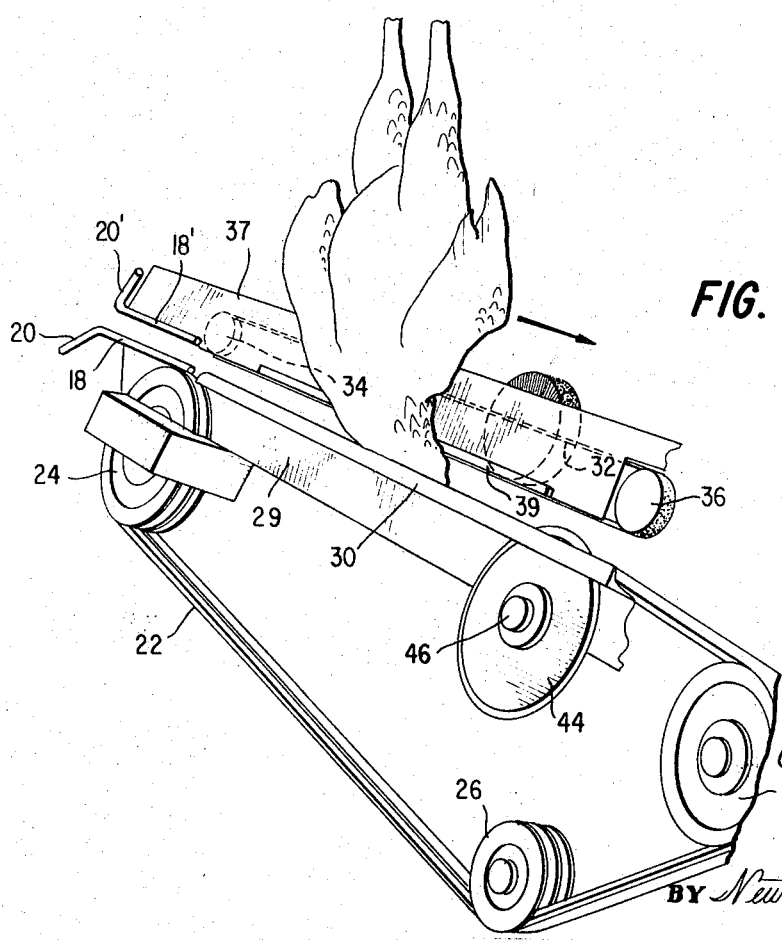

After the bird is conveyed past the guide bars 18 and 18', the head thereof is taken up and lightly gripped by the guides 30 and 39 and the belts 22 and 32 associated therewith. Referring now to FIG. 5, it may be seen that the bird next comes into contact with the spinning electrode brush 42, which gives the head a slight shock sufficient for stunning the bird. Because of the brush characteristics of the shocking device 42, the feathers of the neck of the bird contacted thereby are wiped away to provide more efficient operation of the device by permitting better contact to be made between the electrode and the bird. As indicated hereinabove, the lower belt 22 moves slightly faster than does the upper belt 32. This belt speed differential is operative to turn the head of the stunned bird toward the blade 44, whereby the jugular vein is accurately positioned to be cut by the blade without beheading the bird as it is conveyed past that point in the channel 38.

Obviously, many modifications and variations of the present invention are possible in the light of the above teachings. It is therefore to be understood that within the scope of the appended claims, the invention may be practiced otherwise than as specifically described.

I claim:

1. Apparatus for killing poultry, comprising; means for conveying a fowl suspended in a head lowermost position along a predetermined path; means for electrically shocking and thereby stunning said fowl, said means comprising a wire brush electrode for wiping away feathers and simultaneously shocking said fowl, said wire brush electrode being a wheel-shaped rotatable brush connected to a power source; and means for cutting the throat of said stunned fowl, said shocking means and said cutting means being disposed in said predetermined path.

2. The apparatus defined in claim 1 further comprising means for rotating said wire brush electrode.

3. Apparatus for killing poultry, comprising; means for conveying a fowl suspended in a head lowermost position along a predetermined path; means for electrically shocking and thereby stunning said fowl; said shocking means and cutting means being disposed in said predetermined path; and means for lightly gripping the head of said fowl at least along the portion of said predetermined path in which said shocking and cutting means are disposed, and for turning the head of said fowl to face said cutting means, whereby the jugular vein is properly positioned for cutting, said gripping and turning means comprising a pair of driven belts adapted to receive therebetween the neck of said fowl; and means for driving one of said belts at a speed greater than the speed of the other of said belts.

4. The apparatus defined in claim 3 wherein said shocking means comprises a rotatable wire brush electrode connected to a power source and positioned adjacent and gripping belts for simultaneously wiping away neck feathers and shocking said fowl, and said cutting means comprises a motor-driven circular blade only partially disposed between the neck-receiving portion of said belts.

5. The apparatus defined in claim 3 wherein said cutting means comprises a motor-driven circular blade having an arcuate portion extending only partially into the neck receiving space between said driven belts.

6. Apparatus for killing poultry, comprising
means for conveying a fowl suspended in a head lowermost position along a predetermined path;
means for electrically shocking and thereby stunning said fowl;
means for cutting the throat of said stunned fowl, wherein said shocking means and said cutting means are disposed in said predetermined path; and
means for lightly gripping the head of said fowl at least along the portion of said predetermined path in which said shocking and said cutting means are disposed, and for turning said head of said fowl to face said cutting means, whereby the jugular vein is properly positioned for cutting.

7. Apparatus for killing poultry, comprising; means for conveying a fowl suspended in a head lowermost position along a predetermined path; cutting means disposed in said predetermined path; and means for lightly gripping the head of said fowl at least along the portion of said predetermined path in which said cutting means is disposed, and for turning the head of said fowl to face said cutting means, whereby the jugular vein is properly positioned for cutting, said gripping and turning means comprising a pair of driven belts adapted to receive therebetween a portion of said fowl; and means for driving one of said belts at a speed greater than the speed of the other of said belts to effect said turning of the head.

8. Apparatus for killing poultry, comprising:
spaced guide means defining a predetermined path;

cutting means located adjacent at least one side of said spaced guide means and detailed in location to include a cutting edge projected a predetermined distance into said predetermined path;
means for conveying a fowl suspended in a head lowermost position along said predetermined path toward said cutting means so that the neck of said fowl is advanced between said spaced guide means; and
means operatively associated with said spaced guide means for lightly gripping opposite sides of said fowl adjacent the base of the skull, said gripping means being operable for effecting a predetermined angular rotation of the head of said fowl to position the head of said fowl to face along said path toward said cutting means so that said cutting edge will make a predetermined cut through the side of the neck adjacent the base of the skull to sever the jugular vein to permit rapid bleeding of the fowl through said cut without detaching the head from the neck.

9. Apparatus as defined in claim 8 further characterized in that said gripping and rotating means includes a pair of driven belts, one located adjacent each of said spaced guide means with means for driving one of said belts at a predetermined speed greater than the speed of the other of said belts for effecting said angular rotation.

10. Apparatus for killing poultry, comprising means for conveying a fowl suspended in a head lowermost position along a predetermined path;

means for cutting the throat of said fowl, wherein said cutting means are disposed in said predetermined path; and means for lightly gripping the head of said fowl at least along the portion of said predetermined path in which said cutting means are disposed, and for turning said head of said fowl to face said cutting means, whereby the jugular vein is properly positioned for cutting.

* * * * *